March 23, 1943. G. E. FRITTS 2,314,821
DEVICE FOR GRIPPING RODS AND THE LIKE
Filed Aug. 26, 1941
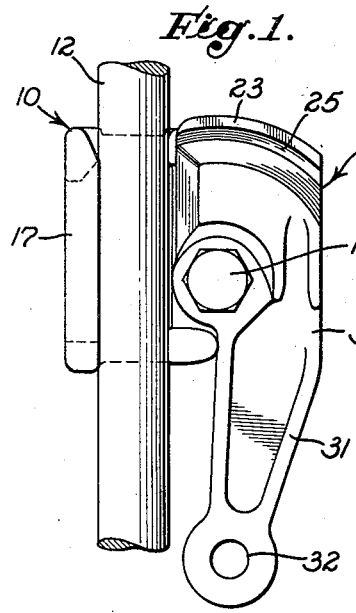
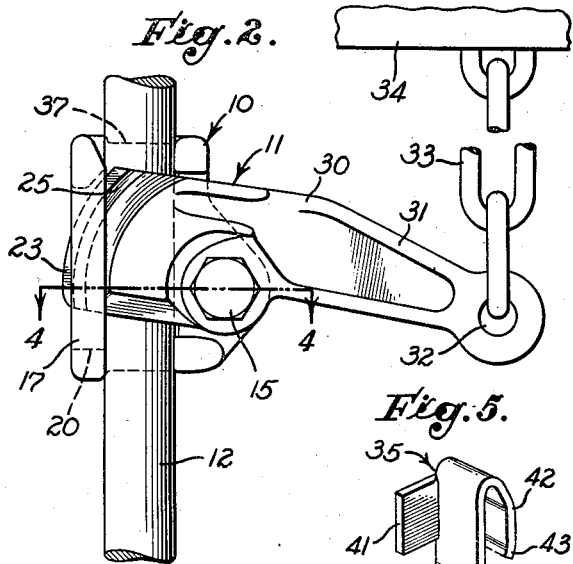
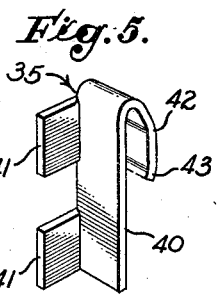
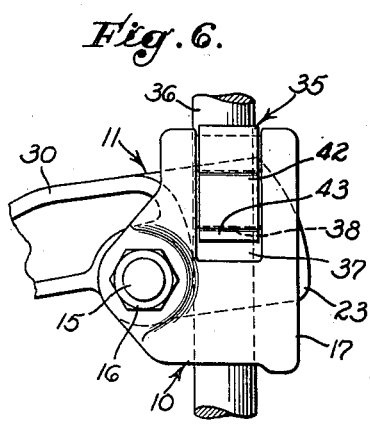
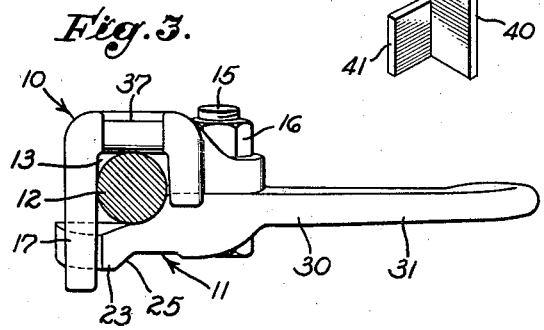
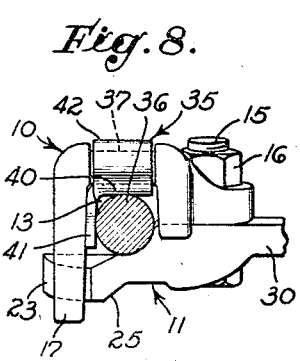
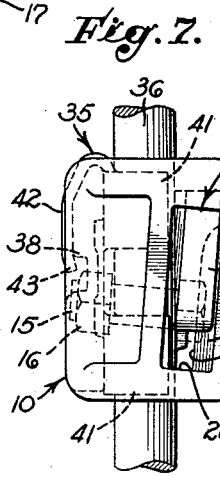
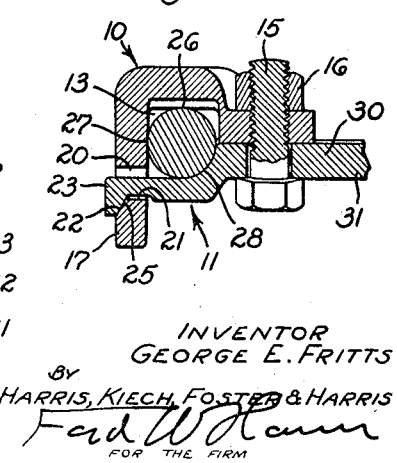
INVENTOR
GEORGE E. FRITTS
BY
HARRIS, KIECH, FOSTER & HARRIS
FOR THE FIRM
ATTORNEYS.

Patented Mar. 23, 1943

2,314,821

UNITED STATES PATENT OFFICE 2,314,821

DEVICE FOR GRIPPING RODS AND THE LIKE

George E. Fritts, Torrance, Calif.

Application August 26, 1941, Serial No. 408,307

7 Claims. (Cl. 24—249)

My invention relates to devices for releasably gripping elongated objects. While the invention is applicable broadly to means for gripping various objects, especially elongated objects of uniform cross section, such as bars, pipes, beams, and the like, it is being initially embodied in a clamp for gripping and supporting sucker rods and the like in the oil well art. For the purpose of the present disclosure I elect to describe such an application of the invention in the knowledge that the disclosure will be adequate guidance for adapting the invention to any other useful purpose.

In the employment of subterranean reciprocating pumps in an oil well, it is necessary at intervals to withdraw and dismantle the string of sucker rods to permit repairing or replacing of pump members. The string of rods is broken down into sections or stands about ninety feet long, which are usually suspended from some form of hanger as fast as they are disconnected from the string. Hangers in common use, for example, the hanger disclosed in my Patent No. 1,627,733, generally include a frame adapted for temporary suspension from a derrick and a plurality of chains depending from the frame, each chain carrying a clamp to releasably engage and support a section of rod. The present invention relates to the construction of such a clamp.

The first consideration in the designing of a clamp for sucker rods is safety. Since the sucker rods are of considerable weight and are suspended by the clamps above the working crew, the failure of any clamp may have serious consequences. Some common causes of accidents of this nature include shearing of the pivot that interconnects the jaws of a clamp, spreading of the clamp jaws, and accidental releasing operation of the clamp. Accidental release is commonly caused by the numerous clamps on a hanger fouling each other.

The object of the present invention is to provide an efficient, sturdy, and durable clamp that is especially designed to avoid accidents arising from the above mentioned causes. One specific object is to provide a clamp construction in which the pivot for the two jaws is stressed in tension rather than in shear. Another specific object is to provide means for positively interconnecting the two jaws at points spaced away from the jaw pivot for the purpose of preventing any spreading of the jaws. In the preferred practice of my invention it is contemplated that the two jaws will releasably engage with each other in a manner to prevent spreading movement of either jaw in various outward directions.

Still another specific object is to provide an effective tendency for the jaws to stay closed against accidental forces. I propose to provide a clamp that is self-locking in the sense that closing of the clamp brings into cooperation friction surfaces producing an effective tendency to hold the clamp closed independently of weight or other force from the gripped rod. It is old in this art to design a rod clamp to derive its gripping force from the gripped rod, but such a clamp commonly relaxes automatically when accidentally relieved of the rod weight. In this regard a further feature in the preferred form of the invention is the concept of not only providing for inter-jaw friction to discourage releasing operation, but also to provide for friction between the clamped rod and at least one of the jaws for the same purpose.

One object of the invention is to provide a clamp that may be employed to grip objects of more than one size in cross dimension. More specifically stated, the object is to provide a clamp in which an insert may be removably mounted to reduce the effective gripping clearance of the clamp jaws. A further object in this aspect of the invention is to provide a clamp that will grip a cylindrical object with what may be termed a three-point grip and to provide a removable insert that may be employed to restrict the gripping clearance of the clamp with respect to one or more of the three points.

A still further object of the invention is to provide a clamp that may be rapidly and conveniently engaged and disengaged, preferably a clamp that may be manipulated by one hand for engagement and disengagement.

Other objects and advantages of the invention will be apparent in my detailed description to follow, taken with the accompanying drawing.

In the drawing, which is to be considered as illustrative only,

Fig. 1 is a side elevation of the preferred form of my clamp showing the clamp jaws positioned for initial movement against a length of sucker rod;

Fig. 2 is a similar view with the two jaws in effective gripping positions;

Fig. 3 is a plan view of Fig. 2;

Fig. 4 is a horizontal section taken as indicated by the line 4—4 of Fig. 2;

Fig. 5 is a perspective view of an insert that may be used with the clamp;

Fig. 6 is a side elevation of a clamp equipped with the insert, the clamp being closed;

Fig. 7 is a front elevation of the clamp equipped with the insert; and

Fig. 8 is a plan view of the clamp equipped with the insert.

The clamp shown in the drawing has what may be termed a first jaw generally designated 10 and what may be termed a second jaw generally designated 11. The first jaw 10 is preferably adapted to engage a sucker rod 12 laterally with respect to the sucker rod and to make contact with the sucker rod for pressure against the sucker rod in more than one radial direction. The particular jaw 10 shown in the drawing is formed with what may be termed a recess 13 dimensioned to receive the sucker rod, the recess being adapted to extend longitudinally of the sucker rod. On what may be termed the rearward side of the recess 13, the first jaw 10 is connected with the second jaw 11 by a suitable pivot bolt 15 carrying a nut 16. On the front side of the recess 13 the jaw 10 is provided with an integral extension or lip 17 that is adapted for positive engagement or frictional engagement with the second jaw 11. The purpose of such positive engagement is to prevent the jaws from spreading and the purpose of such frictional engagement is to provide gripping cooperation between the two jaws or to present accidental releasing operation of the two jaws.

To arrange for the desired cooperation between the second jaw 11 and the lip 17 of the first jaw 10, the lip may be channeled or otherwise formed to provide a friction surface or pressure surface for contact with a cooperating surface of the second jaw. In the particular construction shown in the drawing the lip 17 is formed with a slot 20. Preferably the slot 20 is inclined with reference to the axis of the recess 13, i. e., with reference to the longitudinal axis of the sucker rod 12 when the sucker rod is in the recess. If the slot is so inclined, preferably the pivot bolt 15 that rotatably inter-connects the two jaws is correspondingly inclined, i. e., approximately perpendicular to the direction of the slot as indicated in Fig. 7, but it will readily be understood that the pivot bolt may be other than perpendicular to the slot if at least one of the jaws is sufficiently loosely mounted on the pivot bolt to permit the jaw to follow the path of movement determined by the slot.

As best shown in Fig. 4, the side of the slot 20 on the side of the second jaw 11 opposite from the recess 13 may be formed with two surfaces, a surface 21 and what may be called a bevel surface 22. Both of these surfaces 21 and 22 lie to the outer side of the second jaw 11, and both are generally directed toward the opposite or inner side of the jaw 11. Either of the surfaces 21 and 22 may be employed for frictional contact with the second jaw 11, but in the preferred form of my invention I utilize the bevel surface 22 for frictional contact as indicated in Fig. 4. For cooperation with the bevel surface 22, the second jaw 11 is formed with a flange or lip 23 at its outer end that has a bevel surface 25 complementary to the bevel surface 22. Since the jaws move relative to each other about a pivot axis, the two bevel surfaces 22 and 25 are preferably approximately concentric to that axis.

The clamp is preferably designed to engage a sucker rod with a three-point grip. Thus, as best shown in Fig. 4, the recess 13 of the first jaw 10 is formed to make contact with the sucker rod at two spaced peripheral zones 26 and 27, and the second jaw 11 cooperates by making contact with the sucker rod at a third peripheral zone 28, the third zone being, in general, diametrically opposite the mid-point of the first two zones.

Special attention is directed to the direction of mutual thrust of the two jaws 10 and 11 exerted at the bevel surfaces 22 and 25. In the section shown in Fig. 4, for example, the line of mutual thrust normal to the contacting bevel surfaces is inclined relative to the plane of relative rotation of the two jaws. The interengagement of the two jaws and at surfaces so positioned resists in a positive manner the following spreading tendencies: first, the tendency of the first jaw 10 to spread away from the plane of jaw rotation, i. e., to yield outwardly at the peripheral contact zone 26; second, the tendency of the same jaw 10 to spread outwardly along the plane of jaw rotation, i. e., to yield outwardly at the second peripheral contact zone 27; and, third, the tendency of the second jaw 11 to spread away from the plane of jaw rotation, i. e., to yield at the third peripheral contact zone 28.

In the preferred form of my invention the second jaw 11 constitutes one arm of a lever generally designated 30, the second arm of the lever being in the form of a handle 31. It is contemplated that the weight of the sucker rod will be transmitted through the clamp in such manner as to urge the clamp toward closed position. For this purpose, the handle 31 may be formed with an eye 32 to receive the lowermost link of a chain 33, the chain depending from a hanger 34.

Fig. 5 shows an accessory in the form of a spacer or insert, generally designated 35, that may be removably mounted on the clamp in the manner shown in Figs. 6, 7, and 8 for the purpose of reducing the gripping clearance of the two jaws 10 and 11, thereby to permit the jaws to handle a smaller diameter sucker rod 36. In general, such an insert may be designed for service at any of the three peripheral contact zones 26, 27, and 28. In the present practice of the invention the insert is adapted to be mounted in the recess 13 to serve as spacer means at the peripheral zones 26 and 27.

For the purpose of receiving the insert 35, the first jaw 10 of the clamp may be cut away to form a relatively wide receiving groove 37 that extends over a portion of the outer side of the jaw and over the edge of the jaw to the recess 13. Preferably, the receiving groove 37 is deepened on the outer side of the jaw to provide a shoulder 38 (Figs. 6 and 7) for engagement by the insert.

The particular insert 35, illustrated in Fig. 5, comprises a metal band 40 with a pair of spaced perpendicular wings 41 integral therewith. The metal band 40 is bent to form an overhanging tongue 42, thereby to conform to the configuration of the receiving groove 37. The end portion 43 of the tongue 42 is slightly curved inwardly to engage the engagement shoulder 38 of the receiving groove 37, the material of the insert being sufficiently resilient to permit the tongue to yield to whatever degree may be necessary for the mounting and dismounting of the insert. The insert may be forced into place in a simple manner by the application of only moderate force and may be readily removed by first springing the tongue 42 free from the engagement shoulder 38.

In the practice of the invention it is contemplated that some simple tool will be supplied for prying the tongue clear of the engagement shoulder. As an example of dimensions, the sucker rod 12 in Figs. 1 to 4 may be 1" in diameter, and the sucker rod 36 in Figs. 6 to 8 may be ⅞" in diameter, the material of the insert 35 being ⅛" in thickness.

The manner in which the clamp operates will be readily apparent from the foregoing description. In applying the clamp to a sucker rod the workman may hold the clamp in his right hand by grasping the handle 31, and may then turn the handle to a substantially vertical position. The moving of the handle to the vertical position tends to cause the jaw 10 to drop to an open position as may be understood by referring to Fig. 6. If the jaw 10 does not drop to open position automatically, the workman may initiate the opening movement by simply pushing lightly against the jaw with his right thumb. The workman then moves the clamp against a sucker rod to cause the sucker rod to enter the clamp recess 13, as indicated in Fig. 1, whereupon the handle may be swung upward to bring the second jaw 11 into closed position as indicated in Fig. 2. Only one hand is required to carry out the sequential manipulations of the clamp.

The rotation of the jaw 11 from the position shown in Fig. 1 to the position shown in Fig. 2 causes the lip 23 of the jaw to enter the inclined slot 20, the bevel surface 25 of the swinging jaw following the bevel surface 22 of the stationary lip. Since the stationary bevel surface 25 is inclined by virtue of the inclined position of the slot, the swinging jaw is directed in an inclined path to progressively approach the sucker rod at the previously mentioned peripheral zone 28. As a result, the swinging jaw functions as a progressively advancing wedge confined between two converging surfaces, one surface being the stationary bevel surface 22 of the stationary jaw and the other surface being the periphery of the sucker rod. If the hanger chain 33 is now elevated sufficiently to take up the weight of the sucker rod, the effect of the weight will be to create a strong moment to urge the jaw 11 toward an increasingly effective wedging grip.

In the described wedging action of the jaw 11 the clamp offers considerable frictional resistance to opening movement and thereby minimizes the likelihood of the clamp opening outwardly. Once the clamp is engaged with the sucker rod, it tends to maintain engagement, especially if the weight of the sucker rod is transmitted through the clamp. After the clamp is once engaged, the weight of the sucker rod may be completely lifted from the hanger chain 33, and the hanger chain may even be permitted to transmit a substantial portion of its own weight to the clamp handle 31 without danger of the clamp releasing the sucker rod. The highly effective friction for making the clamp self-locking is favored by a relatively low angle of inclination of the slot 20 relative to the sucker rod and is further favored by providing for relatively extensive contact between the two bevel surfaces 22 and 25, on one hand, and between the jaw 11 and the periphery of the sucker rod, on the other hand.

An object and feature of the above described form of the invention relates to the avoidance of damage to the sucker rod by the gripping action. Nicking or cutting the material of the sucker rod not only weakens the rod by altering the metal structure and setting up internal stresses, but also favors corrosion by admitting water and corrosive substances such as acids. The described device has no teeth, ridges, serrations, or other gripping projections that might damage the surface of the sucker rod and yet provides the effectiveness of grip that is associated with the use of such gripping expedients.

For the purpose of full disclosure and to illustrate the principles involved, I have described a specific form of my invention. Various changes and modifications under my inventive concept, however, will occur to those skilled in the art, and I reserve the right to all such departures from my description that lie within the scope of my appended claims.

I claim as my invention:

1. A device of the character described for gripping an elongated object to resist longitudinal movement of the object in one direction, said device comprising: a first jaw adapted to contact said object from one side; a second jaw adapted to contact said object from the other side; and pivot means connecting said second jaw to said first jaw for opening and closing movement, the axis of said pivot means being transverse to said direction of longitudinal movement but inclined relative to a plane perpendicular to said direction, whereby closing movement of said second jaw relative to the first jaw causes said second jaw to progressively approach the longitudinal axis of the elongated object when the elongated object is in contact with said first jaw, the direction of closing movement of said second jaw being in the direction of said longitudinal movement, whereby the tendency of the gripped object to make such longitudinal movement relative to the device urges the second jaw by frictional contact therewith into increasing pressure against the object.

2. A device of the character described for gripping an elongated object to resist longitudinal movement of the object in one direction, said device comprising: a first jaw formed with a recess to receive said object laterally; a second jaw to grip said object in said recess; and pivot means connecting said second jaw to said first jaw, the axis of said pivot means being inclined relative to a plane perpendicular to the longitudinal axis of the elongated object when the object is in said recess, whereby closing movement of said second jaw causes the second jaw to progressively approach said longitudinal axis, the direction of closing movement of the second jaw being in the direction of said longitudinal movement, whereby any tendency of the gripped object to make such longitudinal movement frictionally urges the second jaw into tighter grip on the object.

3. A device of the character described to releasably connect an elongated object to a member to resist longitudinal movement of the object in one direction relative to the member, said device comprising: a first jaw adapted to contact said object from one side; a second jaw adapted to contact said object from the other side; pivot means connecting said second jaw to said first jaw for opening and closing movement, the axis of said pivot means being transverse to said direction of longitudinal movement but inclined relative to a plane perpendicular to said direction, whereby closing movement of said second jaw relative to the first jaw causes said second jaw to progressively approach the longitudinal axis of the elongated object when the elongated object is in contact with said first jaw, the direction of closing movement of said second jaw being in the direction of said longitudinal movement, whereby the tendency of the gripped object to make such longitudinal movement relative to the device urges the second jaw by frictional contact therewith into tighter grip; and means operatively connecting said second jaw with said member to urge said second jaw in closing direction in response to any force urging said second jaw bodily in said direction of relative movement.

4. A device of the character described to releasably connect an elongated object to a member to resist longitudinal movement of the object in one direction relative to the member, said device comprising: a first jaw formed with a recess to receive said object laterally; a second jaw to grip said object in said recess; and pivot means connecting said second jaw to said first jaw, the axis of said pivot means being inclined relative to a plane perpendicular to the longitudinal axis of the elongated object when the object is in said recess, whereby closing movement of said second jaw causes the second jaw to progressively approach said longitudinal axis, the direction of closing movement of the second jaw being in the direction of said longitudinal movement, whereby any tendency of the gripped object to make such longitudinal movement frictionally urges the second jaw into tighter grip, said second jaw being operatively connected with said member to be urged thereby in closing direction in response to any force urging said second jaw bodily in said direction of relative movement.

5. A device of the character described for gripping an elongated object to resist longitudinal movement of the object in one direction, said device comprising: a first jaw to engage said object from one side; a second jaw to engage said object from the opposite side; and pivot means connecting said second jaw to said first jaw, the axis of said pivot means being inclined relative to a plane perpendicular to the longitudinal axis of the elongated object when the object is engaged by said first jaw, whereby closing movement of said second jaw causes the second jaw to progressively approach said longitudinal axis, the direction of closing movement of the second jaw being in the direction of said longitudinal movement, whereby any tendency of the gripped object to make such longitudinal movement frictionally urges the second jaw into tighter grip, said two jaws having complementary portions for mutual friction engagement at contact areas spaced from said pivot means, said complementary portions cooperating to discourage opening movement of said second jaw when said object is gripped by the two jaws.

6. A device as set forth in claim 5 in which said portion of the first jaw frictionally engages said complementary portion of the second jaw from the outer side of the second jaw to press the inner side of the second jaw against said object for further friction to prevent accidental opening movement of said second jaw.

7. A device of the character described for gripping an elongated object to resist longitudinal movement of the object in one direction, said device comprising: a first jaw to engage said object from one side; a second jaw to engage said object from the opposite side; pivot means connecting said second jaw to said first jaw, the axis of said pivot means being inclined relative to a plane perpendicular to the longitudinal axis of the elongated object when the object is engaged by said first jaw, whereby closing movement of said second jaw causes the second jaw to progressively approach said longitudinal axis, the direction of closing movement of the second jaw being in the direction of said longitudinal movement, whereby any tendency of the gripped object to make such longitudinal movement frictionally urges the second jaw into tighter grip, said two jaws having complementary portions for mutual friction engagement at contact areas spaced from said pivot means, said complementary portions cooperating to discourage opening movement of said second jaw when said object is gripped by the two jaws; and a spacer element removably mounted on one of said jaws to restrict the effective gripping clearance between the two jaws.

GEORGE E. FRITTS.